A. Balding.
Dredger.
Nº 10,699.     Patented Mar. 28, 1854.
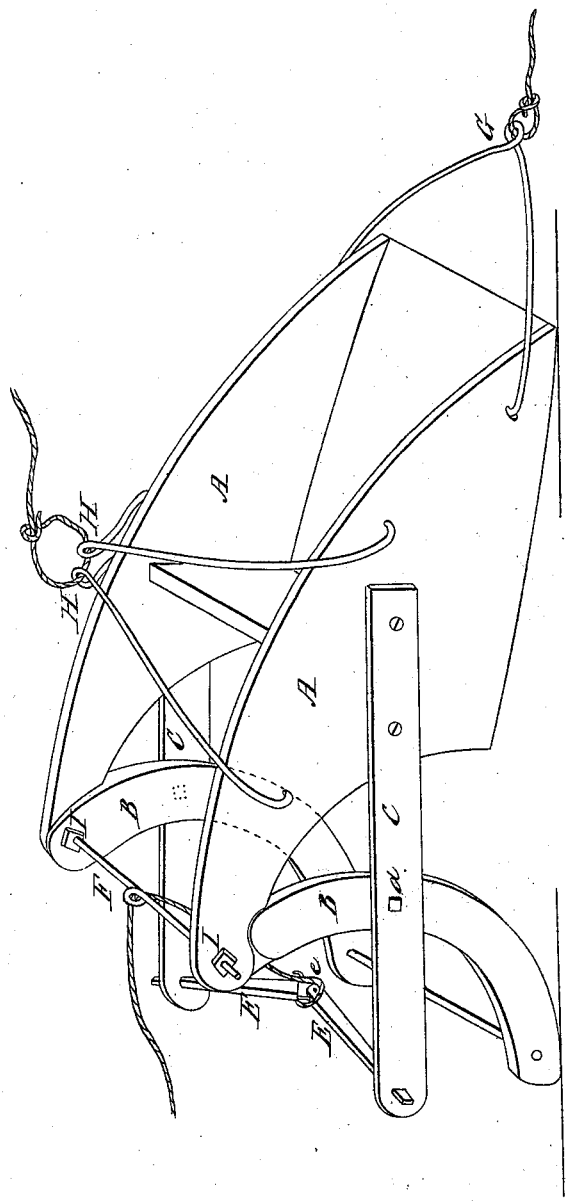

UNITED STATES PATENT OFFICE.

ANSON BALDING, OF OLNEY, ILLINOIS.

SUBMARINE SCOOP.

Specification of Letters Patent No. 10,699, dated March 28, 1854.

*To all whom it may concern:*

Be it known that I, ANSON BALDING, of Olney, in the county of Richland and State of Illinois, have invented a new and useful Improvement in Submarine Scoops; and I do hereby declare that the following is a full, clear, and exact description of the same, reference being had to the accompanying drawings, making part of this specification, in which the scoop is in position for work or being filled.

The nature of my improvement consists in so constructing a scoop for the removal of earth under water, that it may be operated effectually without the necessity of a person entering the water either to hold up the handles in filling the body of the scraper, or in operating the device for that purpose of lowering the handles when the body is filled so as to permit the scoop to be drawn out over, not through the soft earth at the margin of the excavation; this is effected by attaching a sled to the rear of the scoop, which sliding on the bottom of the pond or river to be deepened, raises the handles and rear of the scoop, causing the mouth of the same to enter the soft mud or earth and thus fill; after which by the drawing of a cord or rope carried to the shore the sled is released, the rear of the scoop drops, the mouth rises, and the filled body of the scoop is readily drawn to the shore without the labor of forcing it through the mud after being thus filled.

To enable others skilled in the art to make and use my invention, I will proceed to describe its construction and operation referring to the drawings in which—

A A represent the sides of the scoop made of iron or wood, provided it is sufficiently ironed to readily sink in water; B B the uprights of the sled; C, C, a pair of flat springs which may be made of good ash wood; they are secured on the sides A, A, and are for the purpose of sustaining the uprights B B by means of studs *d* thereon, entering an opening in the spring; E, E, a pair of toggle joint levers, having the joint at *e;* F, a rod with an eye in it for the passage of a rope connected with the toggle joint levers; this rod also serves as a pivot I, I, on which B, B, swing; G the draft stirrup formed of a stout rod of iron; the rope attached to an eye therein, is carried to the shore on which the mud or earth is to be deposited.

H, H, are stirrups for a guy rope, by which the scoop may be suspended or swung from a mast or a float in bringing it to its work in deep water.

The operation is simple and easily understood by reference to the drawing which represents the scoop set for entering the mouth in the earth and filling the body; the horse is attached to the rope from G, the guy rope swung from a mast and attached to H, H, and the rope from F taken in charge; as the horse draws the scoop or scraper the mouth readily enters the earth and fills the body, when the attendant pulling on the rope from F, raises the levers E E in line and force outward the springs C, C, which releasing or withdrawing the studs *d d* (one of which is on dot) releases the uprights B, B, of the sled, and permits it to fall behind, thus dropping the handles and rear of the scoop and raising its mouth, insuring the delivery of its contents irrespective of its soft conditon; the scoop being ashore is emptied by turning it over, is again set and drawn by the guy ropes to the place of its work; the simplicity and slight cost of construction, and its being readily brought to work where the ordinary dredging machines could not be used, are adduced in its favor.

Having described my improvement in scoops or scrapers for working in water, what I claim as my invention and desire to secure by Letters Patent is, The combination of the scoop and sled as described for the purposes set forth.

In testimony whereof I have hereunto signed my name before two subscribing witnesses.

ANSON BALDING.

Witnesses:
JOHN F. CLARK,
JOHN L. SMITH.